April 1, 1930.  C. A. CAMPBELL  1,752,631
FEED VALVE MOUNTING
Filed Jan. 29, 1929  2 Sheets-Sheet 1

Inventor
Charles A. Campbell
By
Attorneys

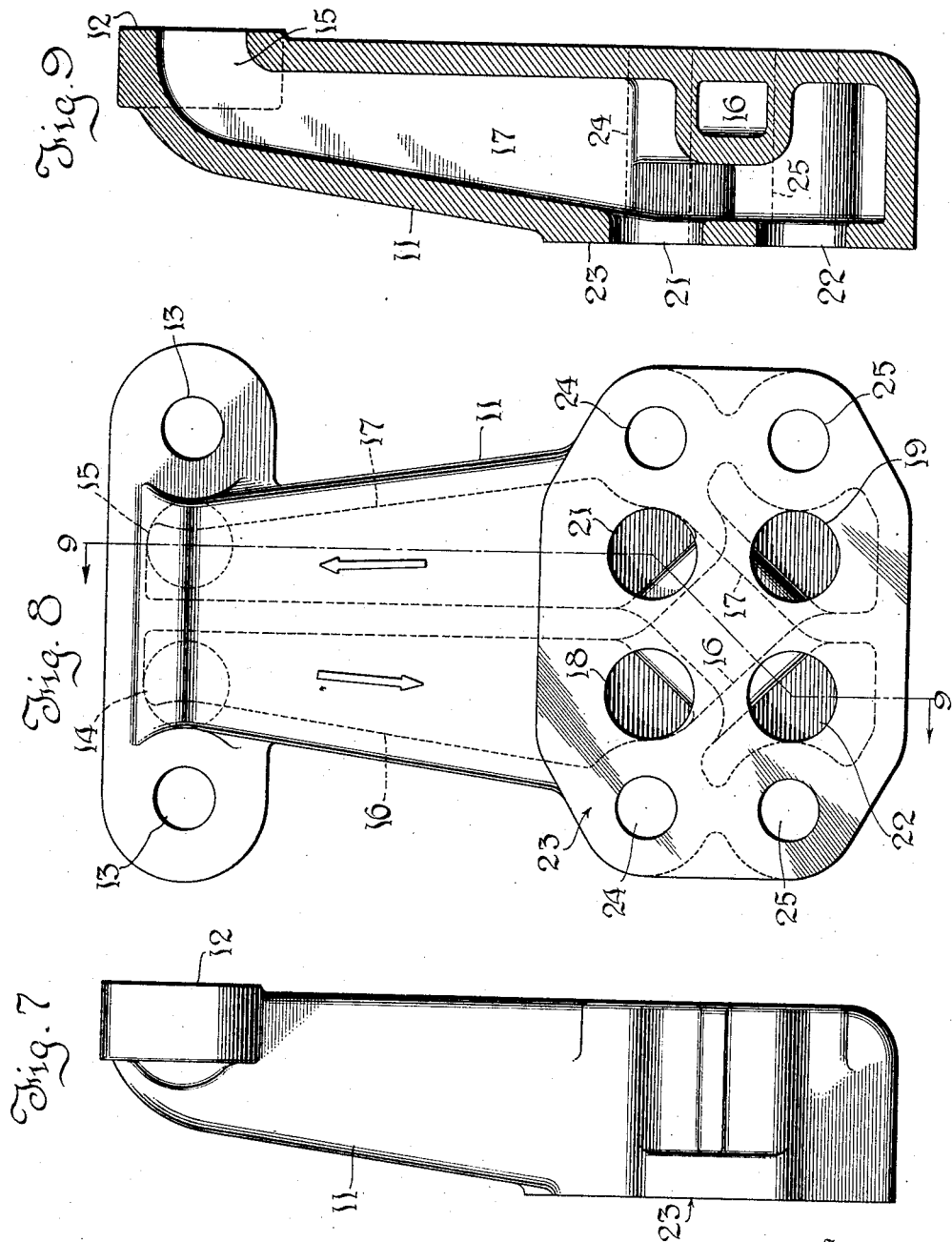

Patented Apr. 1, 1930

1,752,631

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

FEED-VALVE MOUNTING

Application filed January 29, 1929. Serial No. 335,957.

This invention relates to air brakes and particularly to a mounting for feed valves.

The mounting for feed valves has been standardized in the past, to a limited extent, that is to say, the centers of the supply and discharge ports and the centers of the two studs which are used to bolt the feed valve against the face, lie in a straight line, and are symmetrically arranged. The two ports are approximately one-half inch in diameter, and are spaced one inch on centers. The studs are one-half inch in diameter and spaced three inches on centers. As a rule the left hand port is the supply port and the right hand port the discharge port, but this is not invariably the case, and it has been necessary to carry two types of mounting with their connections relatively reversed to meet this variation. Furthermore, there have recently come into use two types of feed valves which must be interchangeable with each other, and one of these, the so-called M type of the Westinghouse Air Brake Company, has the supply passage at the right and the discharge passage at the left, while the other, the F type of the New York Air Brake Company, has the supply passage at the left and the discharge passage at the right.

The present invention is designed to provide a feed valve mounting made in two parts, which can be assembled in two different ways, so that the mounting will connect correctly with either of the two feed valves above set forth. Thus a wide range of requirements can be met with a single bracket.

Generally stated, the mounting comprises a ported body having a mounting face equipped with two sets of ports, the two sets being connected in reverse relations, with a supply passage and a discharge passage formed in the body. Thus a feed valve mounted to communicate with either set of ports will, according to which set of ports is selected, be connected in reverse relations to the passages in the body. The body may be formed in a known manner for pipe connections to the main reservoir and brake valve, but preferably is of the "pipeless" type, also known in the art, and intended to be bolted directly to a ported face on the engineer's brake valve or other mechanism. The pipeless type will be illustrated, but with the understanding that so far as the inventive concept is concerned, the use of the pipe connection type is contemplated in appropriate cases.

In order to allow the feed valve to be mounted selectively in communication with either of the two sets of ports, a reversible selector plate is used which blanks either set of ports and has itself a pair of continuing ports registering with the other set of ports. The continuing ports lead to a mounting face against which the mounting face of the feed valve is mounted.

It will be understood that gaskets are interposed between the body and the selector plate and between the selector plate and the feed valve.

The parts are connected by a pair of bolts which are alined with the set of ports in the selector plate and by a pair of machine screws which are alined with the blanked ports in the body. The locations of the holes for the bolts and the machine screws are symmetrical so that they register in both the relatively reversed positions of the selector plate. The spacing of the ports and the spacing of the holes for the bolts and machine screws conform preferably to the standards heretofore adopted for these parts, but obviously other standards might be adopted if preferred so long as the reversibility of the plate is maintained.

The selector plate is provided with an interference lug, so designed relatively to the contour of feed valves which are likely to be mounted on the device, as to preclude improper assembly.

The preferred embodiment of the invention will now be described in connection with the accompanying drawings, in which,—

Fig. 7 is a side elevation, on a further enlarged scale, of the body member.

Fig. 8 is a front elevation thereof.

Fig. 9 is a section on the line 9—9 of Fig. 8.

Figure 1:
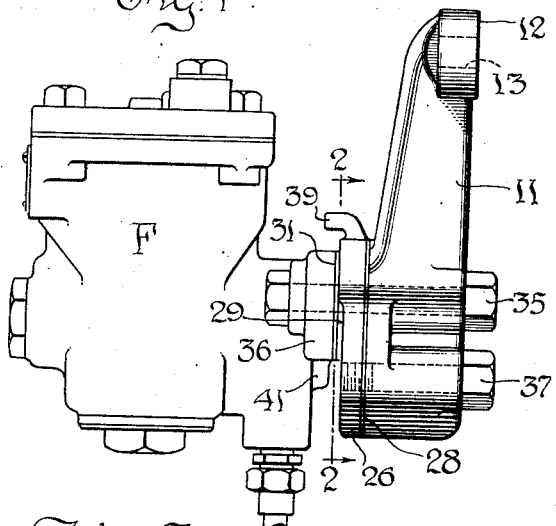
Fig. 1 is a side view of the mounting showing it assembled with a type F feed valve.
Figure 2:
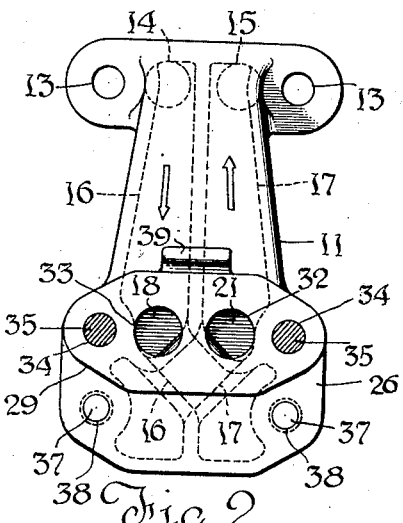
Fig. 2 is a section on the line 2—2 of Fig. 1.

The body member is indicated at 11, and its general form is clearly illustrated in the drawings, particularly Figs. 7, 8 and 9. It includes a mounting face 12 intended to be sealed against a companion mounting face on an engineer's brake valve, or the like device, not shown. A tight joint would be secured by the use of an appropriate gasket, not illustrated, and the body is held in position by studs which pass through the holes 13 and receive the usual nuts. In the mounting face 12 are two ports 14 and 15, which, as will be readily understood, register with companion ports on the mounting face of the engineer's valve. The port 14 is ordinarily the supply port, i. e., that port which brings main reservoir air to the feed valve, and the port 15 is the discharge port, i. e., that port which, under the control of the engineer's brake valve, feeds air at reduced pressure to the brake pipe.

Formed in the body 11 are two cored passages 16 and 17. The passage 16 leads to two ports 18 and 19 and the passage 17 leads to two ports 21, 22, all formed in the mounting face 23, formed on the body 11 and on the opposite side thereof from the sealing face 12. It will be observed that the passages 16 and 17 cross each other in the lower portion of the body 11 and that the ports 18 and 21 are symmetrically arranged relatively to the vertical center line of the body 11, as are the ports 22 and 19.

On a common center line with the ports 18 and 21 are two holes 24, and on a common center line with the ports 22 and 19 are the holes 25. The holes 24 and also the holes 25 are symmetrically arranged with reference to the vertical center line of the body 11.

The rectangular arrangement just described is believed to be the simplest. The main point is that the four ports 18, 19, 21 and 22, and the four holes 24, 25, shall register with the selector plate in two relatively reverse positions. It is obvious that this result can be secured without adhering strictly to the rectangular arrangement described, so that while this is preferred, it is recognized as not strictly essential.

With the parts as shown and with the customary arrangement of ports in the feed valve, the ports on the face 23 fall into two groups, the upper or direct connecting group comprising the ports 18 and 21, and the lower or reverse connecting group comprising the ports 19 and 22.

Interposed between the body 11 and a feed valve designated generally by the letters F or M, is a selector plate 26. The feed valve, indicated at F, is intended to be typical of any feed valve in which the supply connection is at the left and the discharge connection at the right. The feed valve M is intended to be typical of any type in which the supply connection is at the right and the discharge connection at the left.

The selector plate 26 is formed with a mounting face 27 which is mounted against the mounting face 23, an intervening gasket 28 being used in accordance with the standard practice in this art. The opposite face is formed with a boss 29 against which the mounting face of the feed valve F or M, as the case may be, is mounted. A gasket 31 is interposed, as usual.

Extending through the plate 26 and terminating in the face 27 and in the boss 29 are two through passages 32 and 33. Their spacing agrees with the spacing between the ports 18 and 21, which is the same as the spacing between the ports 19 and 22. There are bolt holes 34 arranged on a common center line with the ports 32 and 33, and spaced to register with either the holes 24 or the holes 25 in the body 11.

To mount the type F feed valve, shown in Fig. 1, the plate 26 is arranged with the boss 29 upward, in which case the port 32 registers with the port 21 and the port 33 with the port 18. In such case bolts 35 pass through the holes 24 and 34 and through registering holes in the flange 36 of the valve F. Machine screws 37 pass through the holes 25 and are threaded into two tapped holes 38 in the plate 26. In this position the ports 19 and 22 are blanked.

Figure 3:
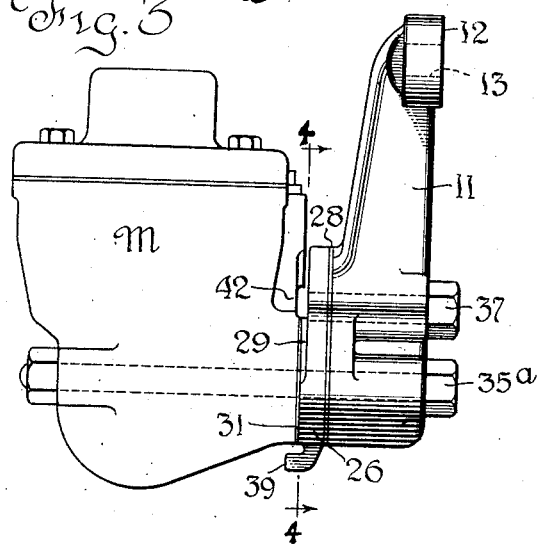
Fig. 3 is a view similar to Fig. 1 and showing the device assembled with a type M feed valve.
Figure 4:
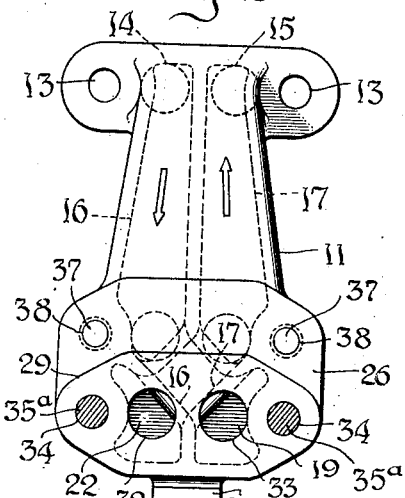
Fig. 4 is a section on the line 4—4 of Fig. 3.
Figure 5:
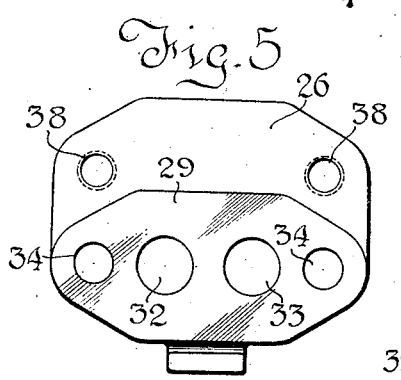
Fig. 5 is a face view of a selector plate drawn on a slightly enlarged scale.
Figure 6:
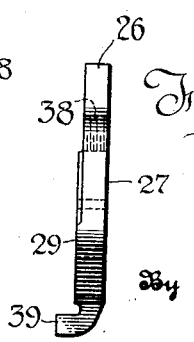
Fig. 6 is an edge view thereof.

In mounting a type M feed valve (see Fig. 3) the plate 26 is mounted with the boss 29 downward, in which case the port 32 registers with the port 22 and the port 33 with the port 19. At such times the ports 18 and 21 are blanked. In such case the same machine screws 37 pass through the holes 24 and are screwed into the tapped holes 38, while longer bolts 35ª are substituted for the short bolts 35, shown in Fig. 1, and pass through registering holes in the body of the feed valve M.

To insure proper assembly with both types of feed valves F or M, the lug 39 is provided. In case of improper assembly this would interfere with a boss 41 formed on the feed valve F for this purpose, or would interfere with a lug 42 formed on the body of the feed valve M, for the same purpose.

The invention above described makes it unnecessary to provide two different mountings for the different types of valves and permits the immediate substitution of one type for the other without the breaking of any pipe joints and without requiring the use of any special adapters or fittings other than the selector plate, which is always present as a part of the combination.

Not only is it possible to mount the two types of valves specifically mentioned for the reverse connections specified, but the mounting is available for any feed valve having standard spacing of the ports and stud holes. This permits a material reduction in the number of parts carried in stock at points where repairs or replacements must be made, and results in marked economies for that reason. It also shortens the time necessary to substitute one valve for another. The particular form of body 11, chosen for illustration, has the effect of lowering the position of the feed valve relatively to the engineer's brake valve, so as to afford good clearance for the valve handle.

Possible modifications have already been suggested and the possibility of modification as to details is recognized.

What is claimed is,—

1. A feed valve mounting comprising a member having a supply passage and a discharge passage; and a ported reversing member capable of assembly with the first named member in two relations, in one of which its ports establish direct connections, and in the other reversed connections with said supply and discharge passages.

2. The combination of a body having two passages, and a mounting face provided with four ports arranged in pairs, the ports of one pair being directly connected with respective passages, and the ports of the other pair being reversely connected to respective passages; a selector member having two continuing ports adapted to be mounted on said mounting face in two positions, in each of which it blanks a different pair of ports and presents its continuing ports in register with the remaining pair; a feed valve having a mounting face provided with ports which register with said continuing ports; and means for clamping the body member, selector member and feed valve in sealing relation with each other.

3. The combination of a body having two passages, and a mounting face provided with four ports arranged in pairs, the ports of one pair being directly connected with respective passages, and the ports of the other pair being reversely connected to respective passages, said body having two sets of bolt holes each similarly located relatively to the ports of a corresponding pair of ports; a selector member having two continuing ports, adapted to be mounted on said mounting face in two positions, in each of which it blanks a different pair of ports in the body and presents its continuing ports in register with the remaining pair, the selector member having bolt holes which register with one set of bolt holes in the body, and tapped holes which register with the other set of bolt holes in the body; a feed valve having a mounting face provided with ports which register with said continuing ports and bolt holes which register with the bolt holes in the selector member; threaded connections which pass through bolt holes in the body, selector member and feed valve; and threaded connectors which pass through bolt holes in the body and are threaded into the selector member.

4. The combination of a body having two passages, and a mounting face provided with four ports arranged in pairs, the ports of one pair being directly connected with the respective passages, and the ports of the other pair being reversely connected to respective passages, said body having two pairs of bolt holes each symmetrically spaced in the center lines of respective pairs of ports; a selector member having two continuing ports, adapted to be mounted on said mounting face in two positions, in each of which it blanks a different pair of ports and presents its continuing ports in register with the remaining pair, the selector member having bolt holes centered in the center line of the continuing ports and spaced to register with respective pairs of bolt holes in the body in the two positions of the selector, and tapped holes to register with the other bolt holes in the body; a feed valve having a mounting face provided with ports which register with said continuing ports and bolt holes centered on the center line of said ports and spaced to register with the bolt holes in said selector member; threaded connectors which pass through the registering bolt holes in the body, selector member and feed valve; and threaded connectors which pass through other bolt holes in the body and engage the tapped holes in the selector member.

5. The combination of a body having two passages, and a mounting face provided with four ports arranged in pairs, the ports of one pair being directly connected with respective passages, and the ports of the other pair being reversely connected to respective passages; a selector member having two continuing ports adapted to be mounted on said mounting face in two positions, in each of which it blanks a different pair of ports and presents its continuing ports in register with the remaining pair; a feed valve having a mounting face provided with ports which register with said continuing ports; means for clamping the body member, selector member and feed valve in sealing relation with each other; and a lug on said selector member adapted to interfere with portions of feed valves and preclude improper assembly.

In testimony whereof I have signed my name to this specification.

CHARLES A. CAMPBELL.